United States Patent
Fornage et al.

(10) Patent No.: US 10,581,336 B2
(45) Date of Patent: Mar. 3, 2020

(54) THREE-PHASE AC/AC CONVERTER WITH QUASI-SINE WAVE HF SERIES RESONANT LINK

(71) Applicant: Enphase Energy, Inc., Petaluma, CA (US)

(72) Inventors: Martin Fornage, Petaluma, CA (US); Damon Charles Cayford, Canterbury (NZ)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 16/229,399

(22) Filed: Dec. 21, 2018

(65) Prior Publication Data

US 2019/0199228 A1 Jun. 27, 2019

Related U.S. Application Data

(60) Provisional application No. 62/610,197, filed on Dec. 23, 2017.

(51) Int. Cl.
| | | |
|---|---|---|
| *H02M 5/293* | (2006.01) | |
| *H02M 5/18* | (2006.01) | |
| *H02M 5/08* | (2006.01) | |
| *H02P 1/30* | (2006.01) | |
| *H02M 5/16* | (2006.01) | |
| *H02M 5/22* | (2006.01) | |
| *H02M 5/297* | (2006.01) | |

(52) U.S. Cl.
CPC .............. *H02M 5/18* (2013.01); *H02M 5/08* (2013.01); *H02M 5/16* (2013.01); *H02M 5/225* (2013.01); *H02M 5/293* (2013.01); *H02M 5/297* (2013.01); *H02P 1/30* (2013.01)

(58) Field of Classification Search
CPC ......... H02M 5/225; H02M 2005/2935; H02M 5/293; H02M 5/275; H02M 2005/2932; H02M 5/297; H02M 5/273; H02M 5/2756; H02M 2005/2937
See application file for complete search history.

(56) References Cited

U.S. PATENT DOCUMENTS

| | | | | |
|---|---|---|---|---|
| 5,010,471 | A * | 4/1991 | Klaassens | H02M 5/271 363/160 |
| 5,943,229 | A * | 8/1999 | Sudhoff | H02M 3/285 363/125 |
| 9,479,082 | B2 | 10/2016 | Fornage et al. | |
| 2004/0145932 | A1 | 7/2004 | Skeist et al. | |
| 2012/0268098 | A1* | 10/2012 | Harrison | H02J 7/345 323/305 |

(Continued)

OTHER PUBLICATIONS

International Search Report and Written Opinion dated Apr. 17, 2019 for PCT Application No. PCT/US2018/067136.

*Primary Examiner* — Harry R Behm
(74) *Attorney, Agent, or Firm* — Moser Taboada

(57) ABSTRACT

An energy control circuit is provided. The energy control circuit includes an input circuit; an output circuit; an energy storage circuit coupled between the input circuit and the output circuit; and a controller coupled to the input circuit and output circuit for controlling an amount of energy stored in the energy storage circuit and for controlling a waveform generated by the output circuit using energy stored in the energy storage circuit.

18 Claims, 12 Drawing Sheets

(56) References Cited

U.S. PATENT DOCUMENTS

| | | | |
|---|---|---|---|
| 2014/0091720 A1* | 4/2014 | Brinlee | H05B 33/0815 |
| | | | 315/186 |
| 2014/0183968 A1* | 7/2014 | Harrison | H02M 5/4585 |
| | | | 307/104 |
| 2015/0078053 A1* | 3/2015 | Harrison | H02M 5/297 |
| | | | 363/132 |
| 2015/0214853 A1 | 7/2015 | Nagai et al. | |
| 2015/0365040 A1* | 12/2015 | Saha | B60L 1/00 |
| | | | 318/400.25 |
| 2016/0094141 A1 | 3/2016 | Petkov et al. | |
| 2017/0250618 A1 | 8/2017 | Amirabadi | |

* cited by examiner

THREE-PHASE AC/AC CONVERTER WITH QUASI-SINE WAVE HF SERIES RESONANT LINK

CROSS-REFERENCE TO RELATED APPLICATIONS

The present application claims the benefit of and priority to U.S. Provisional Patent Application Ser. No. 62/610,197 filed on Dec. 23, 2017, the entire contents of which is incorporated herein by reference.

BACKGROUND

Field of the Invention

Embodiments of the present invention generally relate to power converters and, more particularly, to a method and apparatus for three-phase AC-AC power conversion.

Description of the Related Art

Polyphase AC-AC converters are extremely common in the industrial sector to drive motors, with the ability to impart a given torque and therefore speed to a motor. Motors are typically induction machines (IM) but can also be permanent magnet machines (PMM), synchronous reluctance machines (SynRM) or synchronous machines (SM). The common objective is to use energy from a three-phase low voltage (LV) or medium voltage (MV) AC bus running at standard grid frequency (e.g. 50, 60 Hz or 400 Hz) and send it to the motor while controlling the motor waveforms to achieve the proper motor operation. The output AC voltage might be lower or larger than the grid voltage and the frequency might be significantly lower or larger than the grid frequency. These products are called variable frequency drives (VFD). Other applications, such as mechanically driven power generators (such as a diesel generator), solid state transformers, frequency changers, and the like, require similar functions.

Conventional power converters and variable frequency drives employing either DC Links, AC-Links with pulsed density modulation signals, or matrix converters have been developed for three-phase applications. Each converter topology finds its own set of challenges, whether harmonic content of either the input or output waveforms, output dV/dt, EMC issues, input voltage sensitivity or restricted voltage transform ratios. Such traditional topologies are voltage source inverters (VSI), back to back VSI (BB-VSI), cycloconverters, and matrix converters.

VSIs represent the most common implementation for the VFD market but are plagued by poor distortion and power factor on the grid side. They can only "buck" (reduce) the voltage on the motor side, and they cannot regenerate braking energy to the grid side. They are the simplest devices and only need six diodes and six main switches to operate, yet they do require a large hold-up capacitor which has a low reliability.

BB-VSIs use two VSIs, one used in a boost AC-DC mode and one used in a buck DC-AC mode. There is a DC link connecting the two VSIs. The grid side distortion is much better than with a VSI, boosting is possible, but the complexity is twice the normal VSI' s.

Few equipment has used cycloconverters. This system is plagued by a very high circulating current in the high-frequency (HF) link due to the discrete pulse nature of the resonant link. This approach is therefore quite inefficient compared to other approaches. Matrix converters have emerged as a product category. Although they are improving some issues, they have the highest number of switches, eighteen.

Therefore, there is a need in the art for improved three-phase AC-AC series resonant conversion.

SUMMARY

Embodiments of the present invention relate to a method and apparatus for three phase AC-AC series resonant conversion substantially as shown in and/or described in connection with at least one of the figures, as set forth more completely in the claims.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a bidirectional converter for improved three-phase AC-AC series resonant conversion incorporating a high frequency quasi-sine wave current being precisely applied through the resonant components for generating low distortion multi-phase bipolar waveforms with power reversal capability. The single-stage converter configuration requires one bidirectional switch per converter leg, resulting in a total of twelve unidirectional switches for the three-phase-to-three-phase topology. The AC-AC conversion removes the need for a DC link and associated electrolytic capacitors while still providing both step up and step down (buck and boost, respectively) voltage transfer ratios. The zero-voltage switching (ZVS) nature of the converter provides the converter with an efficient power train coupled with the AC Link results in a compact, efficient low-cost power converter; additional advantages are described in greater detail below.

Figure 1:
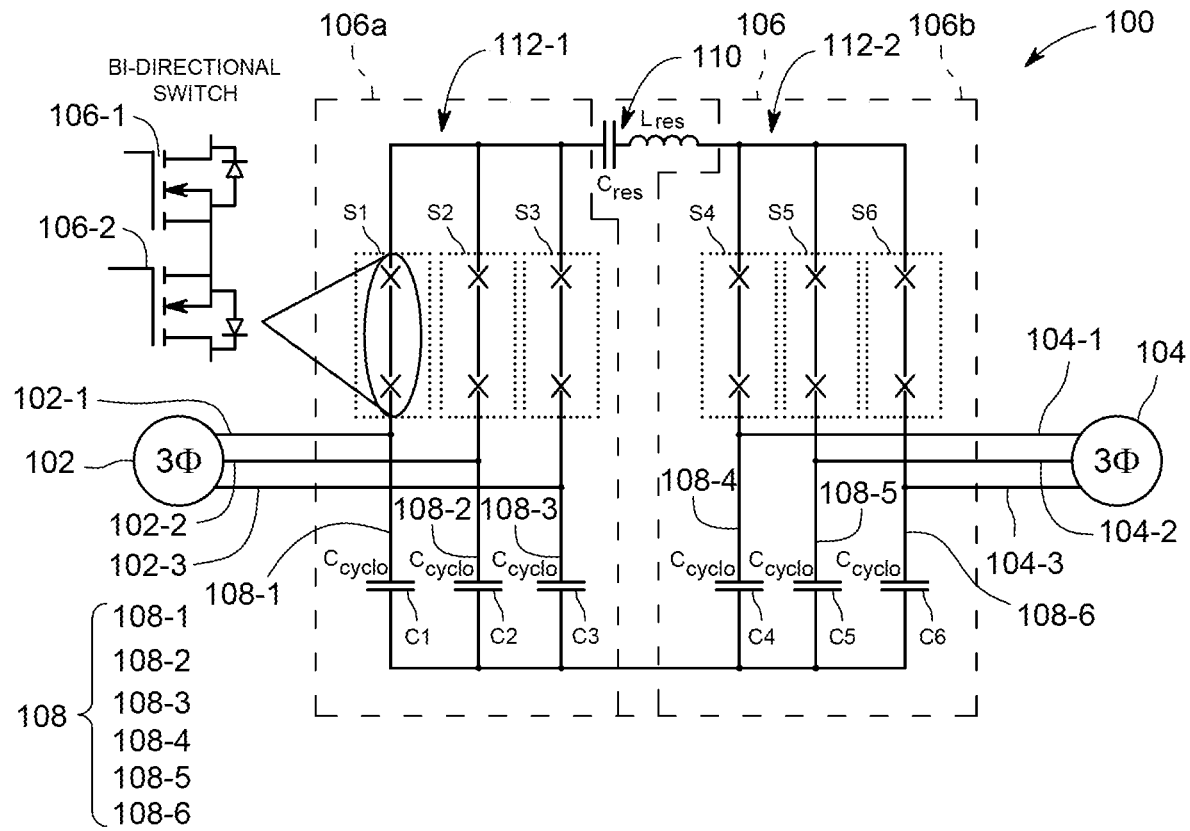
FIG. 1 is diagram of a bidirectional converter including a three-phase series resonant converter (SRC), in accordance with an embodiment of the present invention.

FIG. 1 is a diagram of a bidirectional converter 100 ("converter 100"), e.g., an energy control circuit. The converter 100 comprises a three-phase SRC 106 coupled between an input port 102 and output port 104, which include two three-phase high-frequency cycloconverters 106a and 106b (cycloconverters 106a, 106b), in a half bridge configuration which are controlled in such a way as to provide a quasi-sine wave current through the converter 100 and allows for power transfer to be in either direction, as will be described in greater detail below. Although a quai-sine wave is the most typical waveform, as shall be described below, the converter 100 is highly programmable and can generate any desired waveform, including but not limited to, ramps, triangular, pulses, square, and so on.

The SRC 106 comprises six legs 108-1, 108-2, 108-3, 108-4, 108-5, and 108-6, collectively referred to as SRC legs 108. Each SRC leg 108 comprises a bidirectional switch (which may be simply referred to as "switch") coupled in series with a capacitor—i.e., SRC leg 108-1 comprises bidirectional switch S1 coupled in series with capacitor C1, SRC leg 108-2 comprises bidirectional switch S2 coupled in series with capacitor C2, SRC leg 108-3 comprises bidirectional switch S3 coupled in series with capacitor C3, SRC leg 108-4 comprises bidirectional switch S4 coupled in series with capacitor C4, SRC leg 108-5 comprises bidirectional switch S5 coupled in series with capacitor C5, and SRC leg 108-6 comprises bidirectional switch S6 coupled in series with capacitor C6. Each of the switches S1-S6 is a fully bidirectional (i.e., four quadrant) switch and comprises a pair of switches 106-1 and 106-2 having their source terminals coupled to one another, as shown in the indicated area for the switch S1. The switches 106-1 and 106-2 may be n-type MOSFET switches, other suitable switches and/or arrangements of switches may be utilized for the bidirectional switches S1-S6. Each of the capacitors C1-C6 is a high-frequency bypass capacitor.

The SRC legs 108-1, 108-2, and 108-3 are coupled in parallel; a first line 102-1 from the input port 102 is coupled between a first terminal of the switch Si and a first terminal of the capacitor C1, second line 102-2 from the input port 102 is coupled between a first terminal of the switch S2 and a first terminal of the capacitor C2, and a third line 102-3 from the input port 102 is coupled between a first terminal of the switch S3 and a first terminal of the capacitor C3. The SRC legs 108-4, 108-5, and 108-6 are coupled in parallel; a first line 104-1 from the output port 104 is coupled between a first terminal of the switch S4 and a first terminal of the capacitor C4, a second line 104-2 from the output port 104 is coupled between a first terminal of the switch S5 and a first terminal of the capacitor C5, and a third line 104-3 from the output port 104 is coupled between a first terminal of the switch S6 and a first terminal of the capacitor C6. Second terminals for each of the capacitors C1, C2, C3, C4, C5 and C6 are coupled to one another. The cycloconverter 106a includes the SRC legs 108-1, 108-2, and 108-3 to form a first bridge 112-1 (e.g., an input circuit), and the cycloconverter 106b includes the SRC legs 108-4, 108-5, and 108-6 form a second bridge 112-2 (e.g., an output circuit). The bridges 112-1 and 112-2 may collectively be referred to as "bridges 112".

The SRC 106 comprises a double excited LC resonant network 110 (network 110) having an inductor L-RES and a capacitor C-RES; the network 110 can function as an energy storage circuit. A first terminal of the capacitor C-RES is coupled to a second terminal of the switch S3, a second terminal of the capacitor C-RES is coupled to a first terminal of the inductor L-RES, and a second terminal of the inductor L-RES is coupled to a second terminal of the switch S4.

The converter 100 further comprises voltage and current sensors (not shown) for measuring voltage and current within the converter 100 and as described herein.

The converter 100 comprises a controller 120. The controller 120 is coupled to each of the cycloconverters 106a and 106b (i.e., the cycloconverter switches) as well as to each of the switches S1-S6 (i.e., the gate terminals of the switches 106-1 and 106-2) for controlling operation of the converter 100 as described herein.

The controller 120 comprises support circuits 124 and a memory 126, each coupled to a central processing unit (CPU) 122. The CPU 122 may comprise one or more conventionally available microprocessors or microcontrollers; alternatively, the CPU 122 may include one or more application specific integrated circuits (ASICs). The support circuits 124 are well known circuits used to promote functionality of the CPU 122. Such circuits include, but are not limited to, a cache, power supplies, clock circuits, buses, input/output (I/O) circuits, and the like. The controller 120 may be implemented using a general-purpose computer that, when executing particular software, becomes a specific purpose computer for performing various embodiments of the present invention.

The CPU 122 may be a microcontroller comprising internal memory for storing controller firmware that, when executed, provides the controller 120 functionality described below with respect to FIG. 3.

The memory 126 may comprise random access memory, read only memory, removable disk memory, flash memory, and various combinations of these types of memory. The memory 126 is sometimes referred to as main memory and may, in part, be used as cache memory or buffer memory. The memory 126 generally stores an operating system (OS) 128, if necessary, of the controller 120 that can be supported by the CPU capabilities. In some embodiments, the OS 128 may be one of several commercially available operating systems such as, but not limited to, LINUX, Real-Time Operating System (RTOS), and the like. If the CPU 122 is an ASIC, the memory 126 may be fully or partially built into the ASIC. In addition, the ASIC may operate as a microcontroller and not include an operating system per se.

The memory 126 can be a non-transitory computer readable storage medium that stores various forms of application software including a plurality of instructions that when executed cause the controller 120 to perform the control scheme described herein. The memory 126 may additionally store a database for storing data related to the operation of the converter 100.

The use of the series resonant components C-RES and L-RES in the power train allows for a ZVS switching regime on the power switches S1-S6, resulting in improved reliability of the power electronics due to the reduced voltage stress on the components while reducing the switching losses on the MOSFETs (i.e., the switches S1-S6) as the energy stored in the output capacitance of a switch is recovered. The use of ZVS on the power devices (i.e., the switches S1-S6) also has advantages over other hard switched converters in terms of their EMC characteristics, where the soft switched converter SRC 106 will produce much reduced EMI/RFI signature in comparison.

The controller 120 enables both a buck and boost mode of operation for the SRC 106; as such, a voltage transfer ratio of greater than one can be obtained thus giving the SRC 106 an advantage over matrix converters in terms of the maximum voltage transfer ratio available to that converter, which is approximately 0.866.

The result of the SRC 106 circuit topology coupled with the control scheme described herein is a power converter and motor drive that demonstrates improved performance in terms of size, efficiency, cost and EMC over more traditional types of converters and variable frequency drives.

Figure 2:
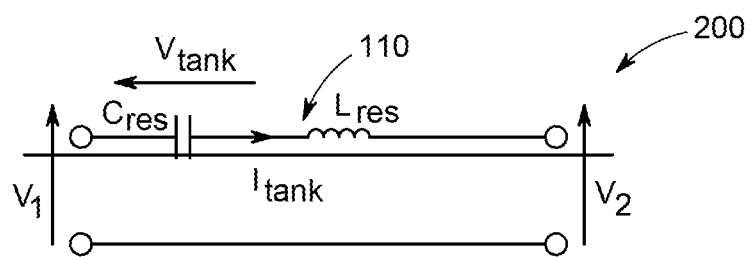
FIG. 2 is a diagram of an SRC equivalent circuit for the three-phase SRC of FIG. 1, in accordance with an embodiment of the present invention.

FIG. 2 is a diagram of an SRC equivalent circuit 200 for the SRC 106. One or more embodiments of the present invention relate to an AC-AC series resonant converter for transfer of electrical power through the network 110 of the converter 100 by means of a quasi-sine wave current, which results from the state of the cycloconverters 106a, 106b which flank the network 110. More particularly, the quasi-sine current is synchronous with the switch actions, which creates a clean waveform, less EMS, and high efficiency, i.e., because the RMS to average current ratio is relatively small. The embodiment of the equivalent circuit shown in FIG. 2 depicts the network 110 and the state of the input port 102 and output port 104 is represented by the quantities $V_1$ and $V_2$ for the line connection and the load connection, respectively. Also shown in FIG. 2 are the resonant current and resonant capacitor voltage quantities $I_{tank}$ and $V_{tank}$, respectively.

Figure 3:
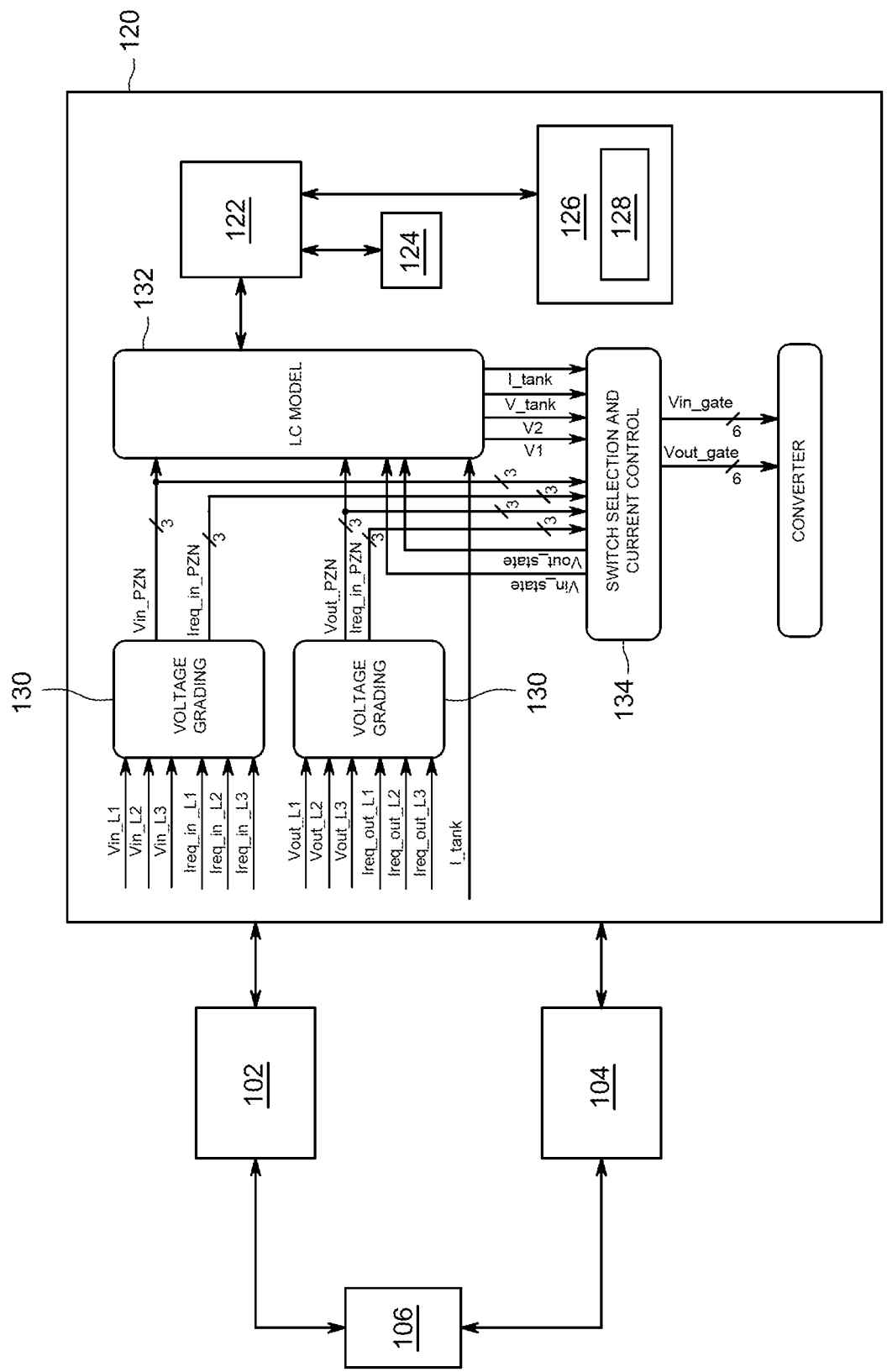
FIG. 3 is a diagram of a control modules for the three-phase SRC of FIG. 1, in accordance with an embodiment of the present invention.

With reference to FIG. 3, a control technique for the SRC 106 is described. Under the control of the controller 120, the SRC 106 control technique measures, by means of voltage and current sensors, the six line and load voltages (i.e., the voltages across each of the SRC legs 108) and the tank current $I_{tank}$. Each line and load voltage is then graded (e.g., as implemented by a voltage grading module 130) into three voltage bins, the most positive voltage, the most negative voltage, and the voltage most near zero and then denoted as P, Z and N along with the demanded current, either into or out of that voltage, is then used to set the amount of current that is to be transferred through the SRC 106. More particularly, only one of the switches S1-S6 is active at a given time, thereby allowing current to flow through the one activated switch and maximizing the power transfer from the energy stored in the network 110.

From known component values of the network 110 and the AC switches S1-S6, an LC mathematical model is created and stored in the memory 126, implemented in the code of the ASIC. Measured voltages, which can be obtained using one or more voltage sensors, and requested currents are entered into this LC mathematical model (e.g., as implemented by an LC module 132). Then, coupled with the knowledge of the state of each of the AC switches (whether they are connected to P, Z or N voltages, i.e., which one of the switches S1-S6 is on) from the switch selector and current control section (e.g., as implemented by an switch selection and current control module 134), the controller 120 can accurately predict the SRC equivalent circuit values of $V_1$, $V_2$, $V_{tank}$ and $I_{tank}$. The controller 120 predicts these SRC equivalent circuit values of $V_1$, $V_2$, $V_{tank}$ and $I_{tank}$. From this information, a correct switch from the switches S1-S6 is switched at the correct time to control the current being transferred from the input phase through the SRC 106 through the resonant circuit network 110 to the output phase by the switch selection and current control module (e.g., as implemented by the switch selection and current control module 134). The controller 120 predicts the SRC equivalent circuit values of $V_1$, $V_2$, $V_{tank}$ and $I_{tank}$ prior (about a hundred nanoseconds or so) to obtaining the actual measured values, i.e., obtained in real-time, and uses the predicted values to select the appropriate switch of the switches S1-S6. Moreover, the controller 120 compares the predicted $I_{tank}$ value, for example, since this value is constantly changing, to a measured $I_{tank}$ value to ensure that the prediction of the SRC equivalent circuit values of $V_1$, $V_2$, $V_{tank}$ and $I_{tank}$ is as accurate as possible. If there is a difference between the predicted and the measured $I_{tank}$ values, the LC model adapts to reduce the difference.

The switch frequency, i.e., how frequently the switches are selected, is based on the amount of energy that is stored by the network 110. For example, as the energy stored by the network 110 increases, the switch frequency decreases, and vice versa. In any event, the switch frequency will not be less than the resonant frequency of the network 110, e.g., 100 kHz. Unlike conventional power converters, the SRC 106 is managed based on an energy stored in/transferred by the network 110.

The current control section (e.g., as implemented by the switch selection and current control module 134) inspects the requested current demands for each of the two bridges 112-1 and 111-2, and grades the current requests into one of six possible modes of operation. For example, using the sign of the current requests for each of the P, Z and N ranked phase voltages, there will always be two currents of equal sign and one with the opposite sign, except for when the SRC 106 is off, i.e., where the current requests for all three phases will be zero which is a condition that can easily be detected. By taking the sign of the single current request and detecting first which rank it was associated with (P, Z or N) and whether it is positive or negative, one of the six modes of operation can be determined as defined in conversion Table 1.

TABLE 1

| $I_{req}$ PZN Sign | | | |
|---|---|---|---|
| P | Z | N | Mode |
| + | + | − | N Sink |
| + | − | + | Z Sink |
| + | − | − | P Source |
| − | + | + | P Sink |
| − | + | − | Z Source |
| − | − | + | N Source |

Figure 4:
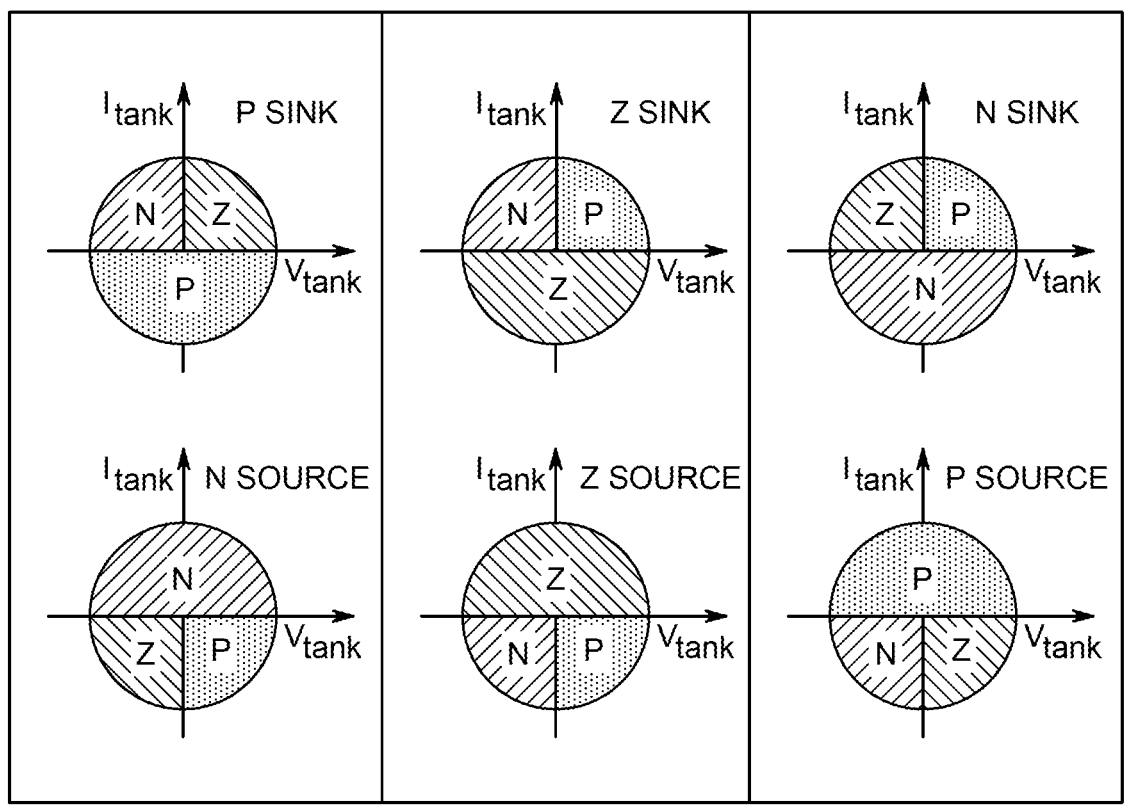
FIG. 4 is a diagram of plots of $V_{tank}$ vs $L_{tank}$ for each of the possible modes of operation of the three-phase SRC, in accordance with an embodiment of the present invention.

FIG. 4 is a diagram of plots of $V_{tank}$ vs $I_{tank}$ for each of the possible modes of operation of the SRC 106. FIG. 4 also shows the phase voltage connection of the load side of the cycloconverter 106b (P, Z or N), thus showing how the resonant current is steered into each phase at the correct value as defined by the current request ($I_{req}$) signals. The $I_{req}$ signals can be calculated by using corresponding measured voltage and power.

For example, $I_{req}$ for switch S1 on the leg 108-1 (e.g., Ireq_in_L1 input to the voltage grading module 130 of FIG. 3) can be calculated using a corresponding measured voltage Vin for the switch S1 (e.g., Vin_Li input to the voltage grading module 130 of FIG. 3) and an input power at the bridge 112-1, i.e., the input phase power.

The value of current transferred using the information in FIG. 4 is related to the voltage change on the capacitor C-RES, hence the diameter of the circle is proportional to the amount of current transferred. The relationship used is related to charge delivered through the capacitor C-RES. For example, in Equation (1):

$$\text{charge} = I_{req}/f_{resonant}, \quad (1)$$

where $I_{req}$ is the required average current in the relevant cycloconverter port (e.g., cycloconverter 106a/input port 102 and cycloconverter 106b/output port 102) and $f_{resonant}$ is the operating frequency of the network 110 at that time. In Equation (2):

$$\text{charge} = CV. \quad (2)$$

By combining the Equations (1) and (2), a change in voltage across the resonant capacitor (V) is defined using Equation (3):

$$V = I_{req}/(f_{resonant} C_{resonant}). \quad (3)$$

By measuring the resonant current ($I_{tank}$), the controller 120 can determine the resonant frequency ($f_{resonant}$) and the capacitor C-RES value (e.g., $C_{resonant}$), and hence the requested current can be translated into voltage across the capacitor C-RES (e.g., $V_{tank}$) as the control variable for charge transfer and hence current transfer.

At any instant in time the controller 120 has three known values of charge for the load side of the output port 104 and three known values of charge for the line side of the input port 102 that can be either injected or drawn from their respective three phase system. The controller 120 connects each phase to the network 110 so that the delta V on the capacitor C-RES from the time the phase is connected to the time the phase is disconnected corresponds to the requested charge transfer for that phase is correct.

Figure 5:
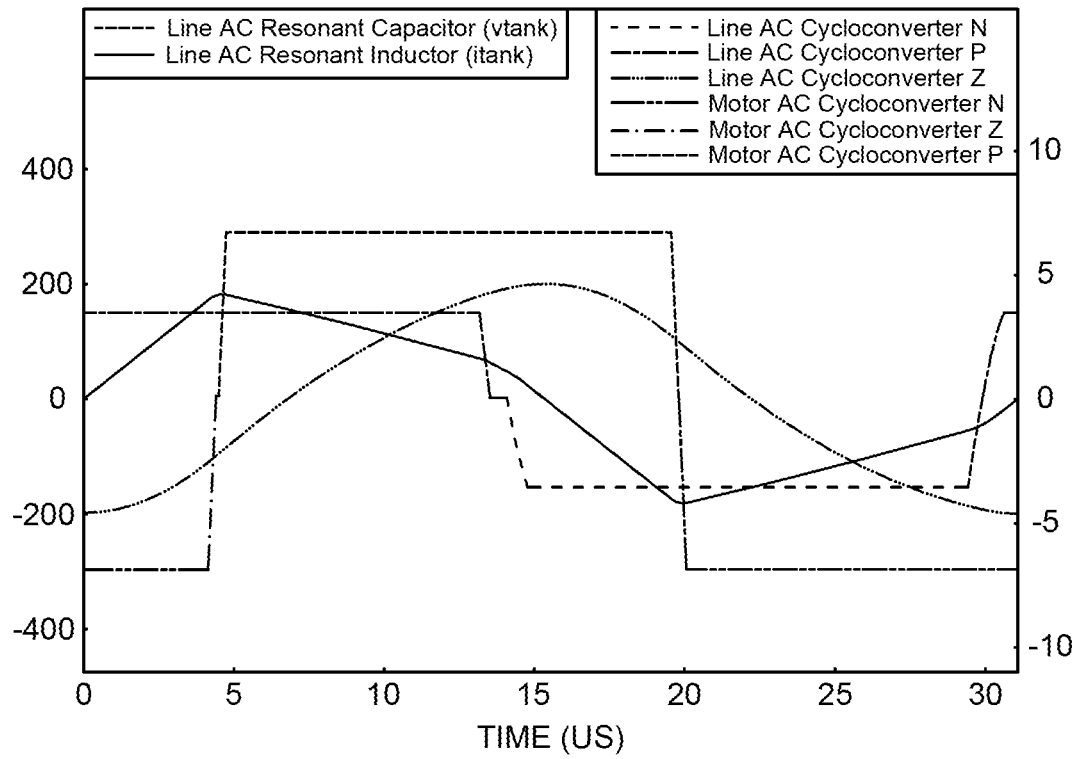
FIG. 5 is a diagram of plots of single resonant cycle three-phase SRC signals (booster mode of operation), in accordance with an embodiment of the present invention.

Referring to FIG. 5, in the N-Sink mode of operation it can be seen that the Z ranked phase is connected to the network 110 at a value of $-V_{tank}$ on the capacitor C-RES, once the value on the capacitor C-RES has exceeded the value $-V_{tank}$+Chargez the state of one of the cycloconverters, e.g., cycloconverter 106a, is changed so that the P ranked phase is connected. The P ranked phase remains connected until the change in V on the capacitor C-RES is equal to the requested charge, the same being true for the N ranked phase with a charge request of charges.

With the single current sensor being used for the measurement of the resonant current $I_{tank}$ and the controller 120 knowledge of the state of each of the cycloconverters 106a, 106b, both the line and the load side three phase currents can be inferred without the need to individually measure each phase current (as described above), thus saving current sensors and supporting measurement circuitry (e.g., ADC channels and current sensors). Moreover, DC currents can be inferred (predicted) without the need for a separate or additional DC capable current sensor.

Referring back to FIG. 4, the control mode is related to a sign of the requested currents but a placement of where the cycloconverters 106a, 106b connect to the relevant phase voltage is related to the direction of the tank current $I_{tank}$ and an expected direction of a phase voltage transition. For example, for the load side of the output port 104 (e.g., the cycloconverter 106b) a positive tank current causes a voltage $V_2$ to rise, and vice versa a negative tank current $-I_{tank}$ will cause $V_2$ to fall, hence all N->P and Z->P transitions will be on a positive tank current while P->Z and P->N will be on a negative tank current. For the line side of the input port 102 (e.g., the cycloconverter 106a), the reverse is true as the current is effectively flowing in the opposite direction through the bridge 112-1 to that of the load side.

In addition to the foregoing, instead of a buck mode of operation, a boost mode of operation can also be used in each of the six modes of operation described above with respect to Table 1.

In the boost mode of operation, the switch selection and current control module 134 further reverses the P, N and Z ranking, e.g., used back into Line 1, Line 2, and Line 3 quantities, so that the power train can be switched with the correct drive connected to the correct line. The voltage grading module 130 records which line was graded into which PZN bin so the process can be reversed.

A mathematical model was created to substantiate/simulate a method of use of the SRC 106 and is summarized in the following FIGS.

FIG. 5 is a diagram of plots of single resonant cycle three-phase SRC signals (booster mode of operation), in accordance with an embodiment of the present invention. For example, FIG. 5 illustrates the action of the $V_1$, $V_2$, $V_{tank}$ and $I_{tank}$ values through one resonant cycle of the SRC 106 acting as a booster with the line voltage at $215V_{rms}$ and the load voltage at $415V_{rms}$. As the required change in $V_{tank}$ has been exceeded and, hence, the required charge (current) has been transferred to the connected phase, the state of either the load side or the line side of the input port 102 and output port 104 (e.g., the cycloconverters 106a, 106b) can be altered to the next state. The state of each of the cycloconverters 106a, 106b is denoted by the legend in FIG. 5. It is also noted that all the voltage transitions of both the cycloconverters 106a, 106b are ZVS.

Figure 6:
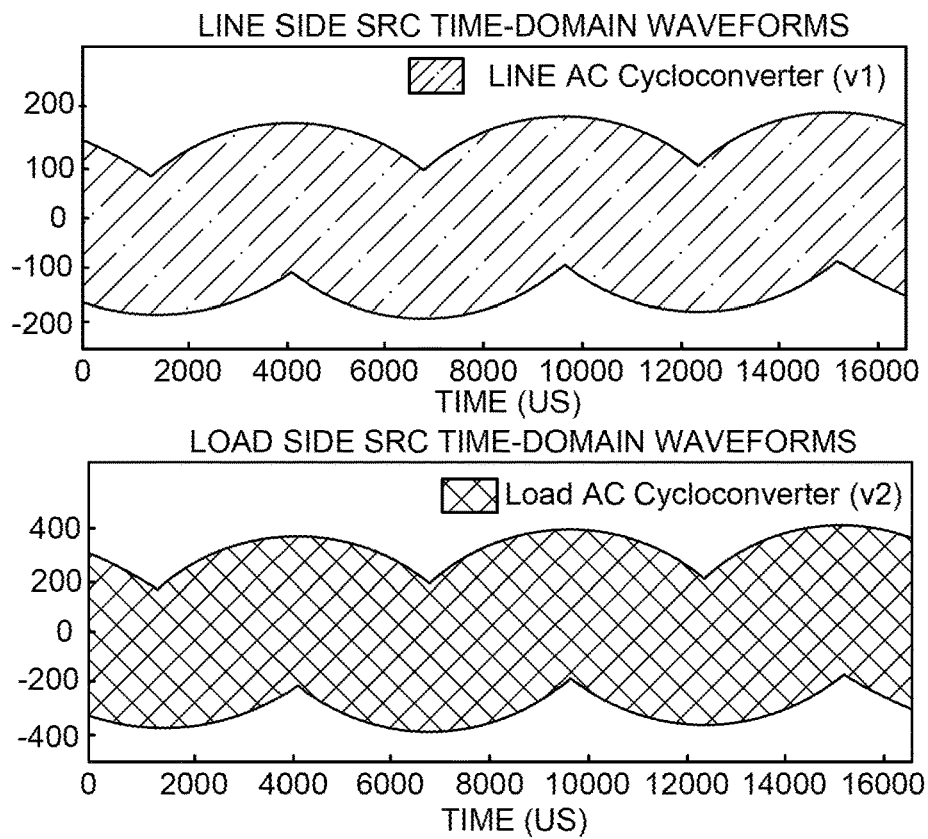
FIG. 6 illustrates diagrams of line side three-phase SRC time-domain waveforms and load side three-phase SRC time-domain waveforms, in accordance with an embodiment of the present invention.
Figure 7:
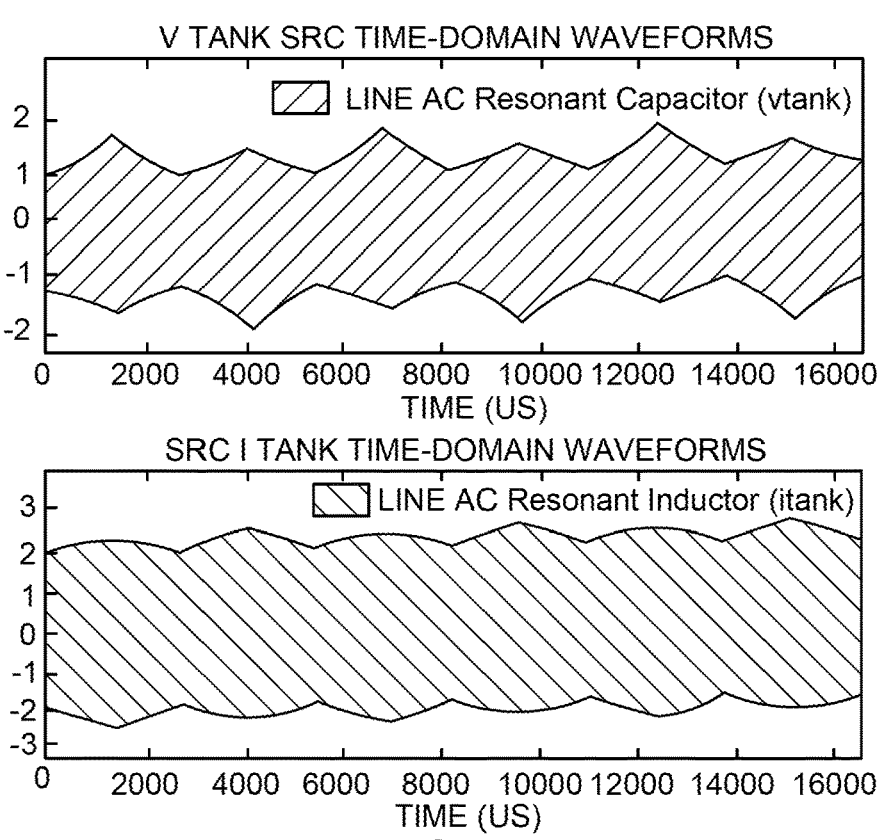
FIG. 7 illustrates diagrams of three-phase SRC $V_{tank}$ time-domain waveforms and three-phase SRC $I_{tank}$ time-domain waveforms, in accordance with an embodiment of the present invention.

FIG. 6 illustrates diagrams of line side three-phase SRC time-domain waveforms and load side three-phase SRC time-domain waveforms. For example, the input port 102 and output port 104 voltages are operating over 60 Hz line and load cycles. FIG. 7 illustrates diagrams of three-phase SRC V tank time-domain waveforms and three-phase SRC $I_{tank}$ time-domain waveforms, i.e., the signals of $V_{tank}$ and $I_{tank}$ over the line cycle while the converter is acting as a booster.

Figure 8:
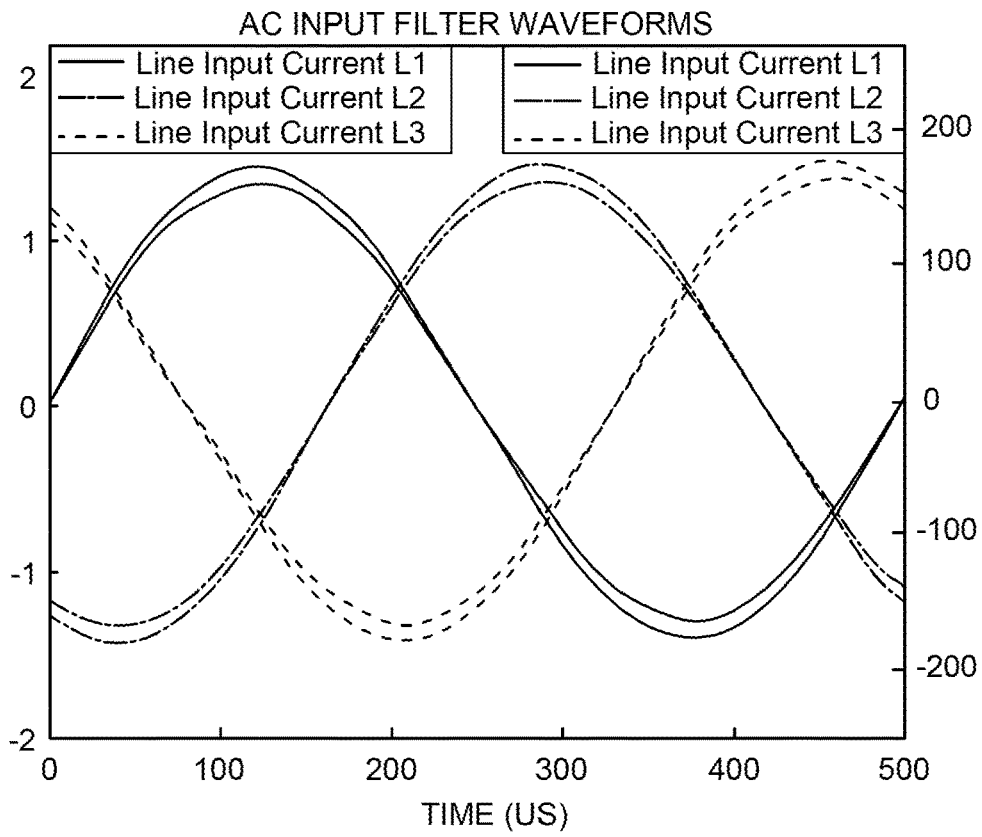
FIG. 8 is a diagram of a plot of AC input filter waveforms, in accordance with an embodiment of the present invention.
Figure 9:
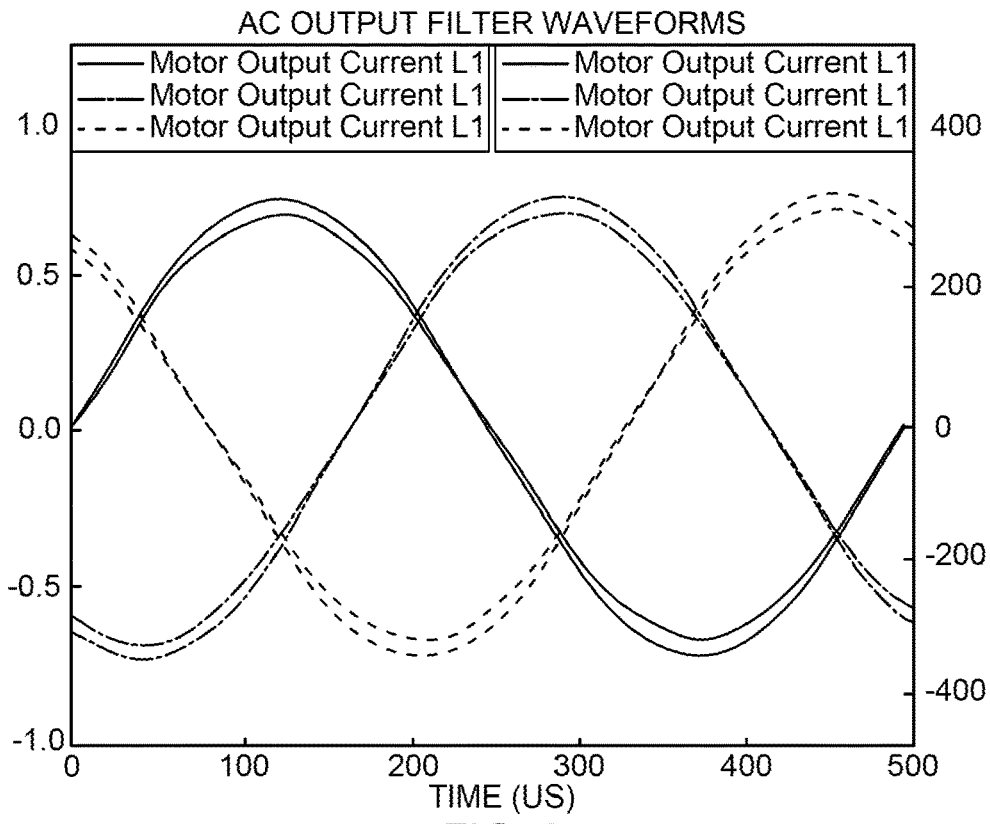
FIG. 9 is a diagram of a plot of AC output filter waveforms, in accordance with an embodiment of the present invention.
Figure 10:
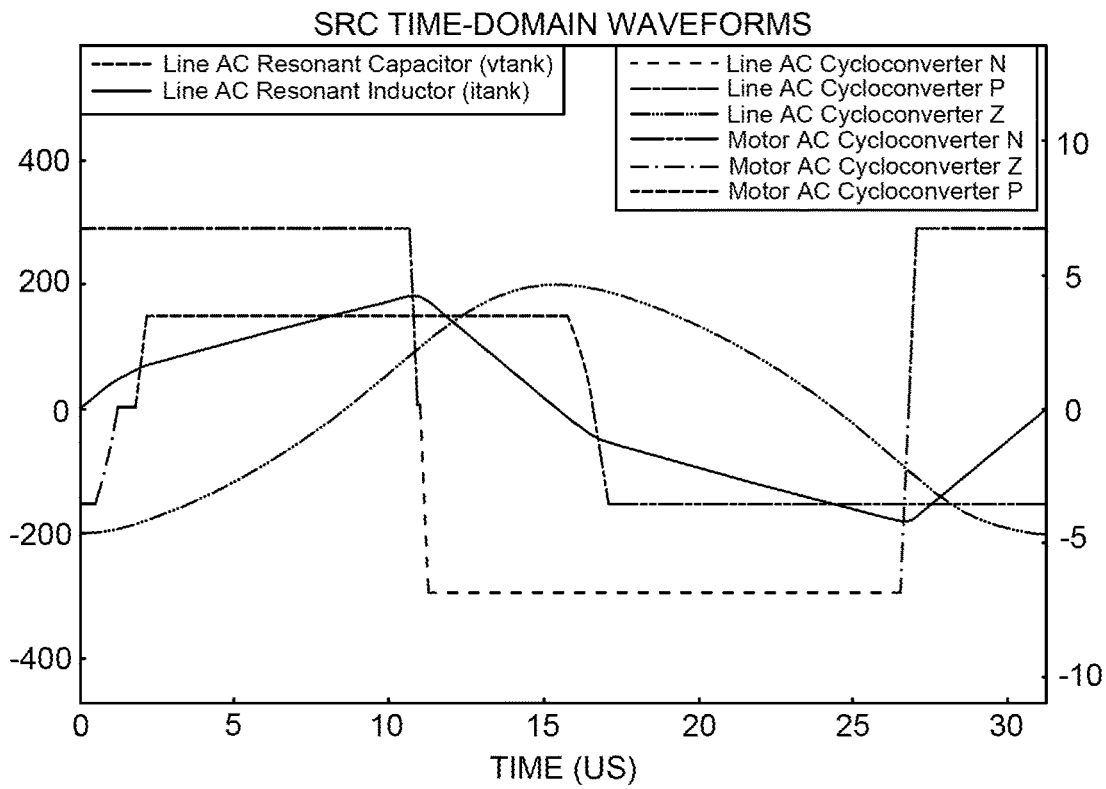
FIG. 10 is a diagram of plots of single resonant cycle three-phase SRC signals (buck mode of operation), in accordance with an embodiment of the present invention.
Figure 11:
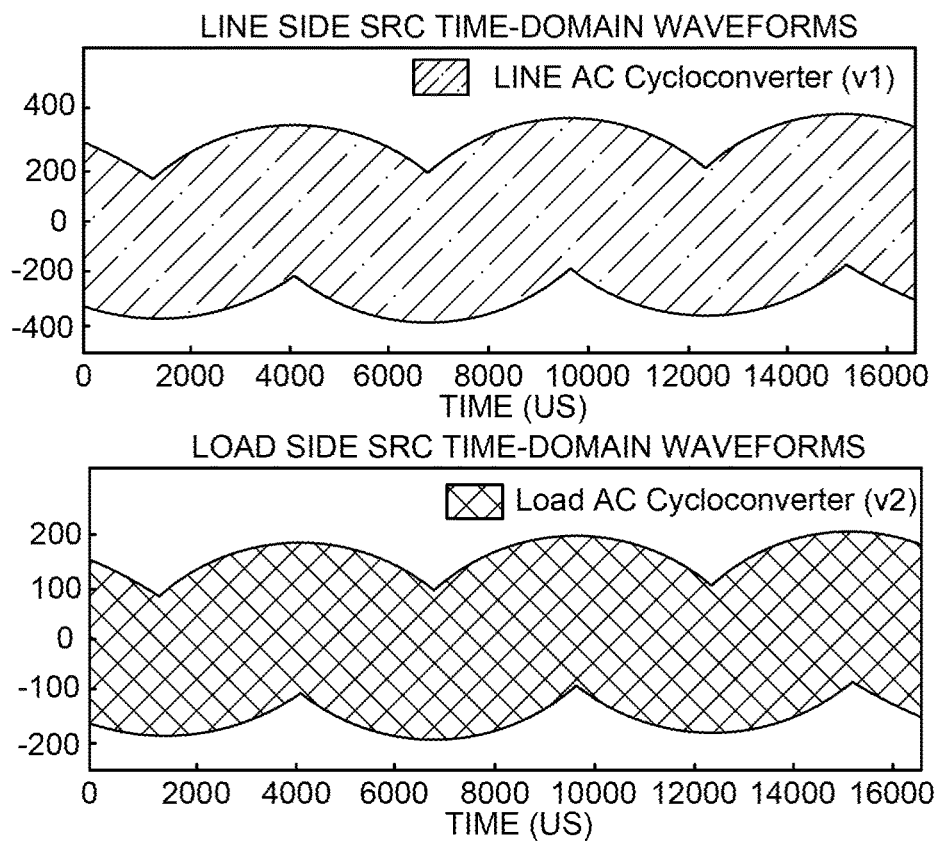
FIG. 11 illustrates diagrams of line side three-phase SRC time-domain waveforms and load side three-phase SRC time-domain waveforms, in accordance with an embodiment of the present invention.
Figure 12:
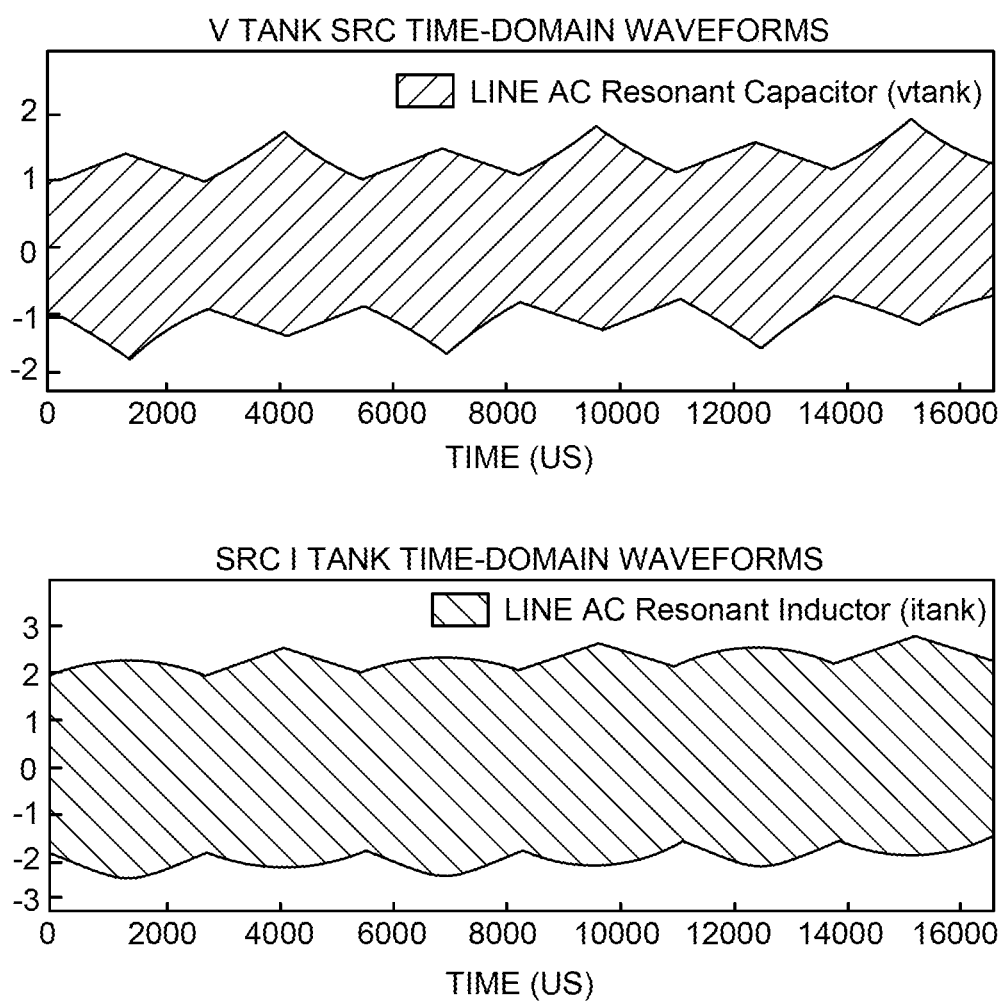
FIG. 12 illustrates diagrams of three-phase SRC $V_{tank}$ time-domain waveforms and three-phase SRC $I_{tank}$ time-domain waveforms, in accordance with an embodiment of the present invention.
Figure 13:
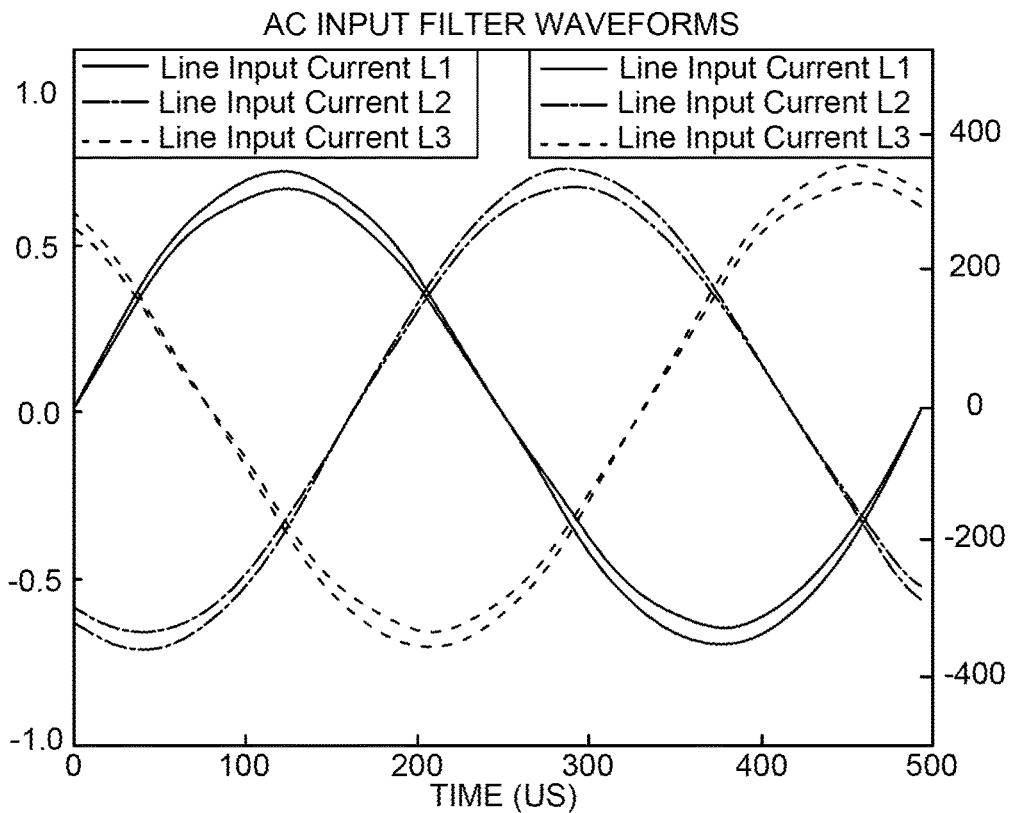
FIG. 13 is a diagram of a plot of AC input filter waveforms, in accordance with an embodiment of the present invention.
Figure 14:
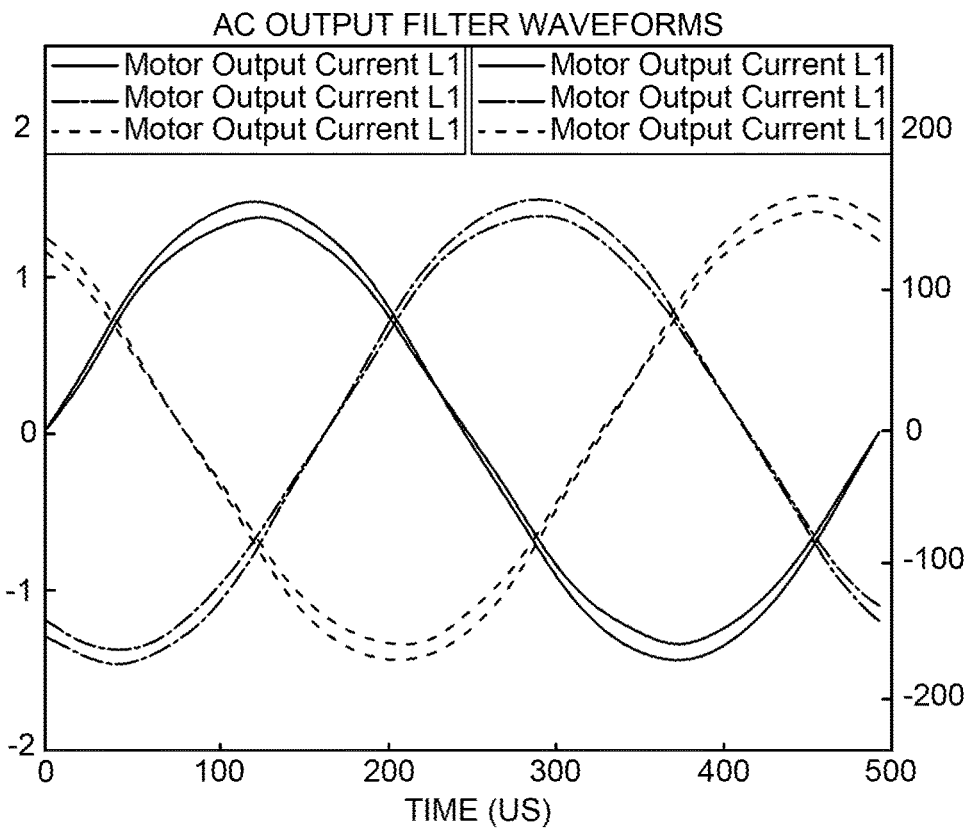
FIG. 14 is a diagram of a plot of AC output filter waveforms, in accordance with an embodiment of the present invention.
Figure 15:
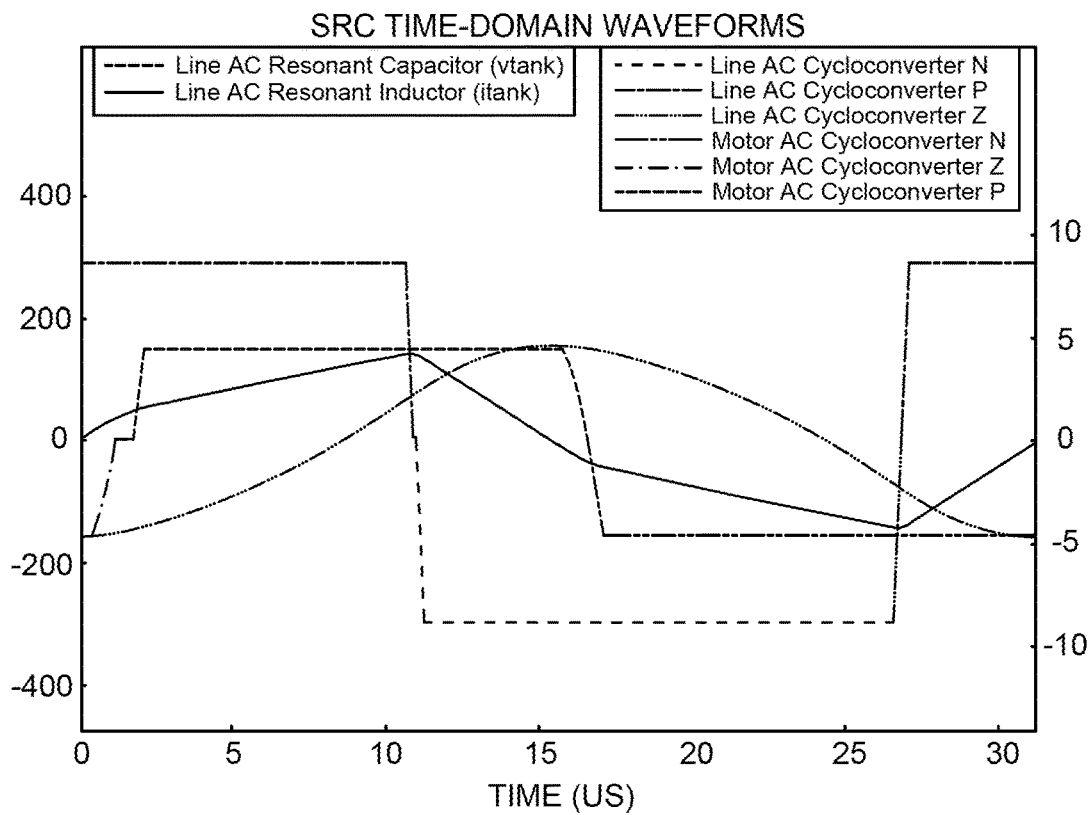
FIG. 15 is a diagram of plots of single resonant cycle three-phase SRC signals (F conversion in the buck mode of operation), in accordance with an embodiment of the present invention.
Figure 16:
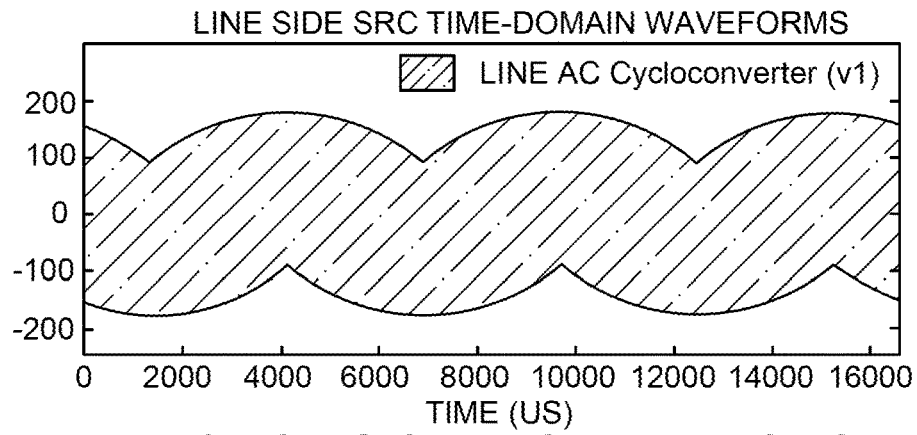
FIG. 16 illustrates diagrams of line side three-phase SRC time-domain waveforms and load side three-phase SRC time-domain waveforms, in accordance with an embodiment of the present invention.
Figure 16:
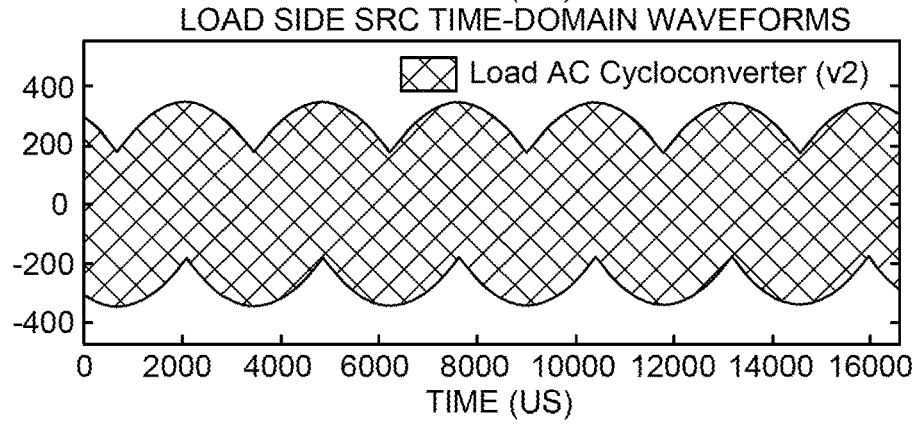
Figure 17:
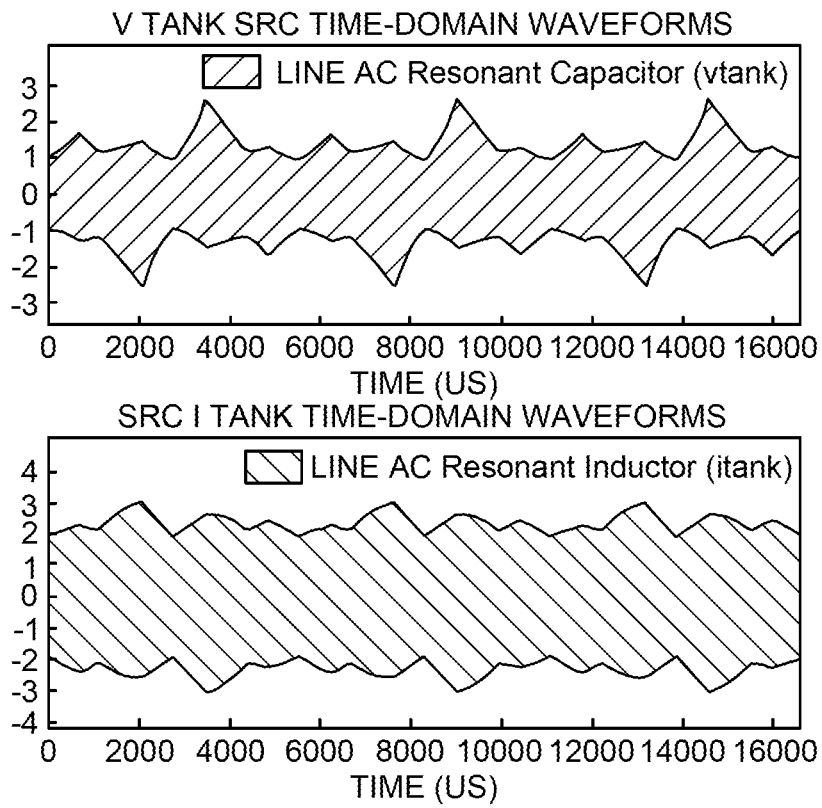
FIG. 17 illustrates diagrams of three-phase SRC $V_{tank}$ time-domain waveforms and three-phase SRC $I_{tank}$ time-domain waveforms, in accordance with an embodiment of the present invention.
Figure 18:
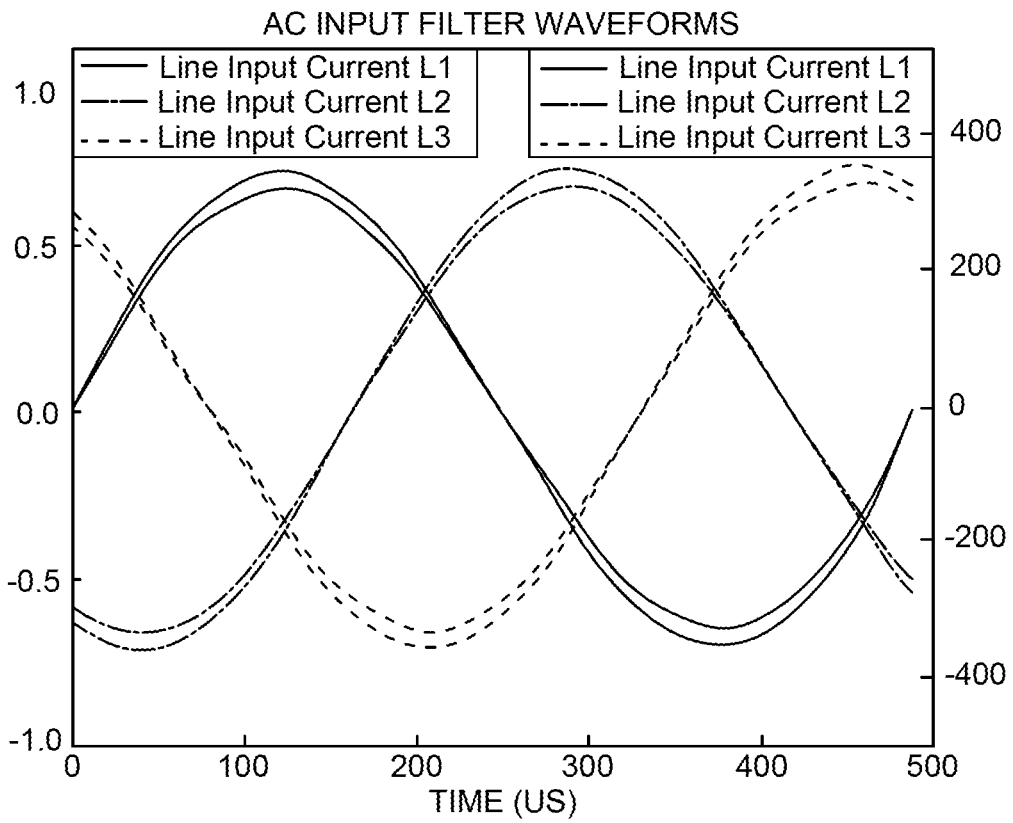
FIG. 18 is a diagram of a plot of AC input filter waveforms, in accordance with an embodiment of the present invention.
Figure 19:
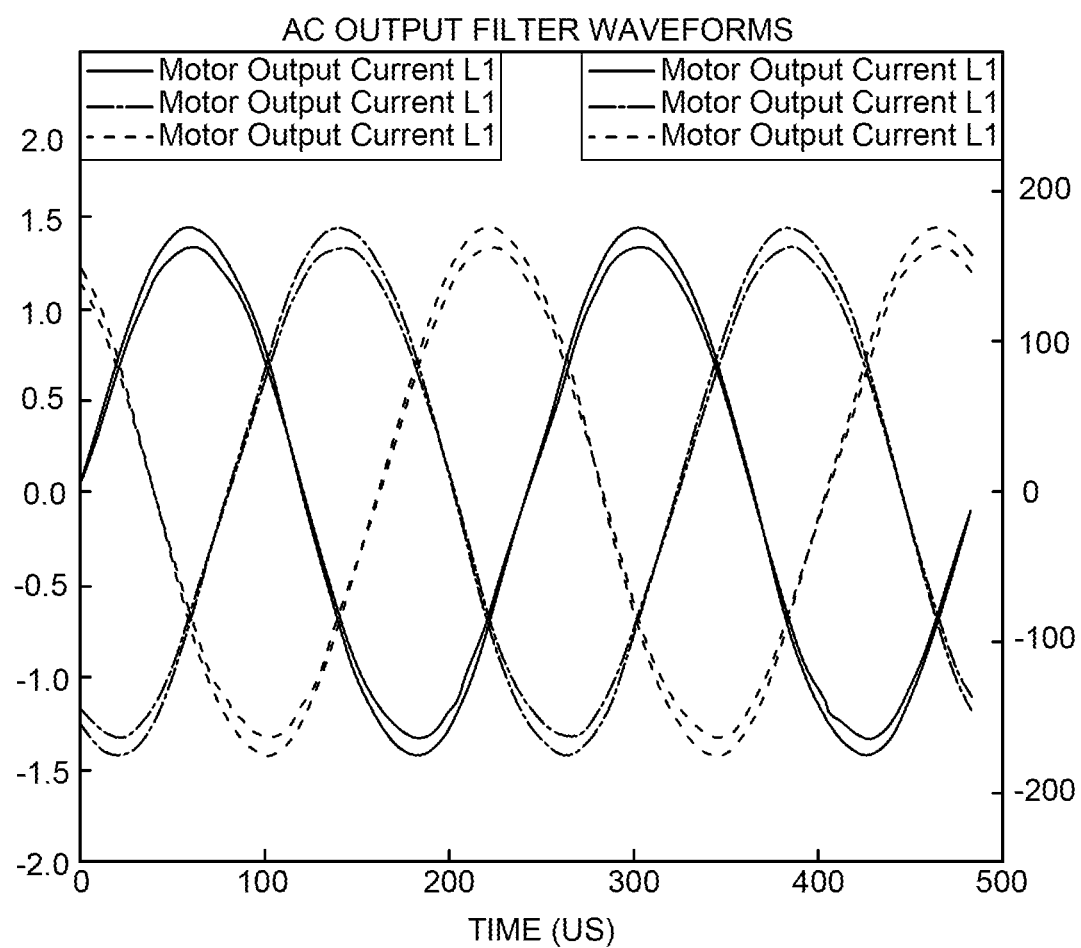
FIG. 19 is a diagram of a plot of AC output filter waveforms, in accordance with an embodiment of the present invention.

FIGS. 8 and 9 illustrate the filtered input and output currents of the SRC 106 and compare it against respective AC voltages to show the respective power factors of both the input and the output.

FIGS. 10-14 show the same information of FIGS. 5-9, but in buck mode operation with the line voltage at $415V_{rms}$ and the load voltage at $215V_{rms}$, and frequency conversion between the line side and load side is illustrated in FIGS. 15-19, where a 415Vrm 60 Hz line side three phase system generates a 215Vrm 120 Hz three phase system on the load side.

In accordance with the embodiments described herein, since input and output currents are essentially independent, i.e., as long as an energy balance is maintained (e.g. |Pin-Pout|=Ploss at all time), it is possible to have different frequencies on both ports (in and out) or even different power factors on both ports.

In some embodiments, with the adjunction of a high frequency transformer, it is possible to have a much larger or lower voltage ratio; this could be implemented using, for example, solid state transformers.

Figure 20:
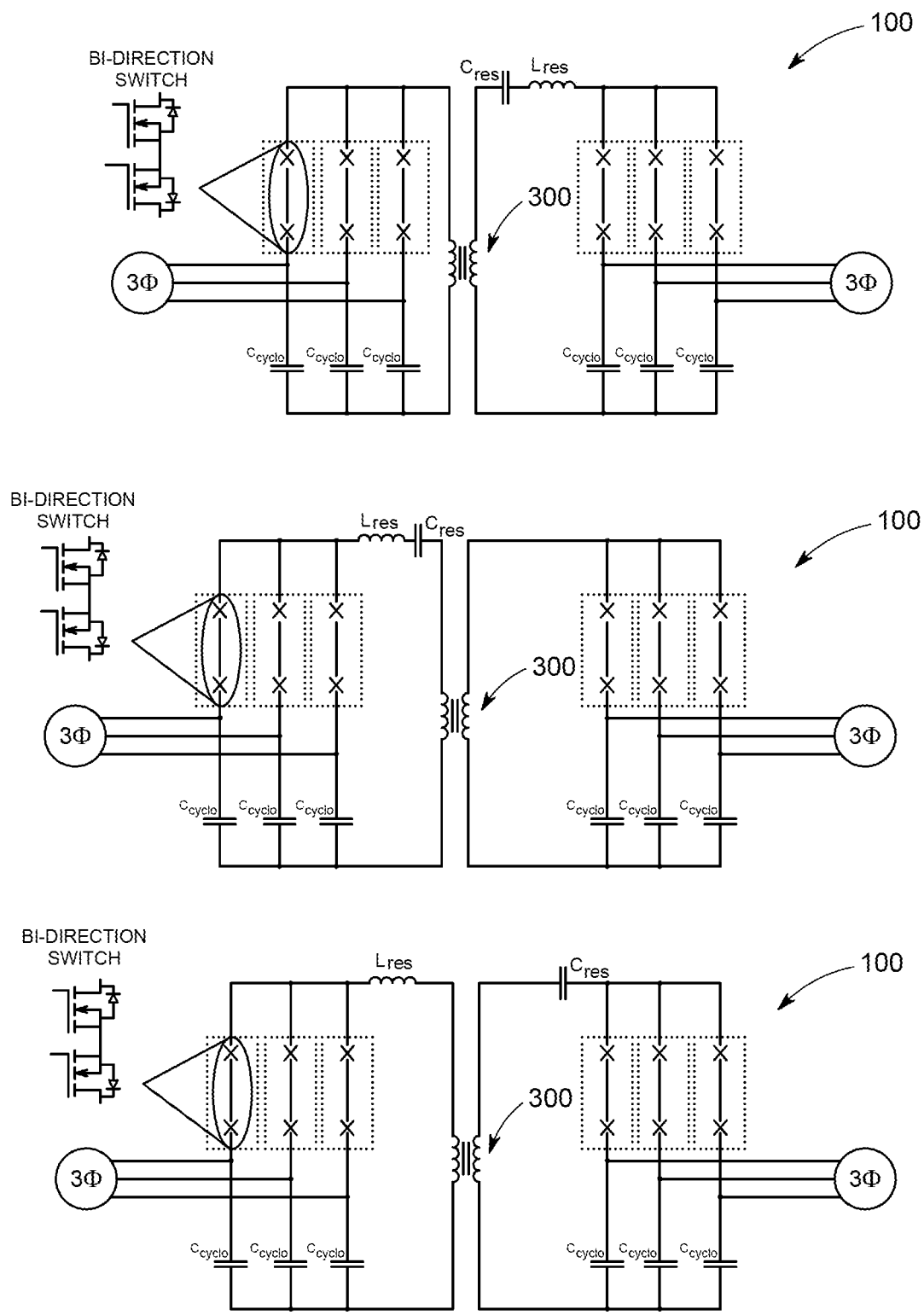
FIG. 20 illustrates diagrams of the three-phase SRC of FIG. 1 including corresponding transformer configurations, in accordance with an embodiment of the present invention.

More particularly, and with reference to FIG. 20, if either extreme (large or small) voltage transformation ratios or galvanic isolation is required between the input port 102 and output port, 104, a transformer 300 of $N_1$ primary turns and N2 secondary turns may be added between, for example, the cycloconverters 106a, 106b to maintain or obtain desired voltage ratios and/or the galvanic isolation. A location of the transformer 300 can be on the line side (top schematic), the load side (middle schematic) or split (bottom schematic) between the resonant components.

While the components, parts, modules, etc. of the converter 100 have been described herein as individual or separate components in operable communication with each other, the present invention is not so limited. For example, the converter 100 including the components, parts, modules, etc. associated therewith can be implemented as a system on chip.

The converter 100 including the SRC 106 overcomes the disadvantages described above associated with conventional power converters. More particularly, the SRC 106: provides power transfer with relatively little noise and/or ripple present on both grid and motor sides; allows for relatively low EMC and magnetic losses in a motor; provides low cost of EMC compliance; and allows for long bearing life without the need for a rotor grounding system; and provides voltage ride through protection.

Moreover, the converter 100 including the SRC 106 can be operated: to transfer energy from the grid to motor or the motor to grid; with regenerative braking, thereby improving operational efficiency; with a multitude of power factors on the grid side, independently from the motor side; with excellent efficiency and switch utilization, small form factor, and without the need for electrolytic capacitors; with no special shielded VFD cables for motor connection; with very small common mode noise between the grid and motor, and between the motor wires and ground; "soft switched," i.e., ZVS is achieved at all times; with very low radiated and conducted EMC signature; with high efficiency and high reliability; and with the ability to buck or boost motor voltage.

While the foregoing is directed to embodiments of the present invention, other and further embodiments of the invention may be devised without departing from the basic scope thereof.

What is claimed is:

1. An energy control circuit comprising:
   an input circuit;
   an output circuit;
   an energy storage circuit coupled between the input circuit and the output circuit; and
   a controller coupled to the input circuit and output circuit for controlling an amount of energy stored in the energy storage circuit and for controlling a waveform generated by the output circuit using energy stored in the energy storage circuit,
   wherein the controller controls a plurality of switches and a switch frequency, which is equal to a frequency at which the plurality of switches are selected, is based on the energy stored in the energy storage circuit such that as the amount of energy stored in the energy storage circuit increases, the switch frequency decreases, and vice versa.

2. The energy control circuit of claim 1, wherein the controller predicts equivalent circuit values $V_1$, $V_2$ of respective voltages for the input circuit and the output circuit and values $V_{tank}$ and $I_{tank}$ of respective voltages and currents for the energy storage circuit and uses the predicted equivalent circuit values $V_1$, $V_2$, $V_{tank}$ and $I_{tank}$ for controlling the amount of energy stored in the energy storage circuit and for controlling the waveform generated by the output circuit using energy stored in the energy storage circuit.

3. The energy control circuit of claim 2, wherein the controller compares a measured value of $I_{tank}$ with the predicted value $I_{tank}$ to ensure that the predicted equivalent circuit values $V_1$, $V_2$, $V_{tank}$ are accurate.

4. The energy control circuit of claim 1, wherein the controller grades measured line and load voltages and corresponding measured currents of a plurality of switches of the input circuit and the output circuit into three bins including a most positive voltage, a most negative voltage, and a voltage most near zero.

5. The energy control circuit of claim 4, wherein the controller grades the corresponding measured currents of the plurality of switches into six modes of operation comprising:
   a first mode, N-Sink, when a measured voltage is most negative and a sign of a measured current is negative;
   a second mode, Z-Sink when a measured voltage is most near zero and a sign of a measured current is negative;
   a third mode, P-Source, when a measured voltage is most positive and a sign of a measured current is positive;
   a fourth mode, P-Sink, when a measured voltage is most positive and a sign of a measured current is negative;
   a fifth mode, Z-Source, when a measured voltage is most near zero and a sign of a measured current is positive; and
   a sixth mode, N-Source, when a measured voltage is most negative and a sign of a measured current is positive.

6. The energy control circuit of claim 1, further comprising a transformer that is connected on one of a side of the input circuit, a side of the output circuit, or between the input circuit and the output circuit.

7. An energy control circuit comprising an energy storage circuit for storing energy and a controller, coupled to the energy storage circuit for controlling an amount of energy stored in the energy storage circuit and for controlling an output waveform generated using energy stored in the energy storage circuit, wherein the controller controls a plurality of switches and a switch frequency, which is equal to a frequency at which the plurality of switches are selected, is based on the energy stored in the energy storage circuit such that as the amount of energy stored in the energy storage circuit increases, the switch frequency decreases, and vice versa.

8. The energy control circuit of claim 7, further comprising an input circuit and an output circuit,
wherein the controller predicts equivalent circuit values $V_1$, $V_2$ of respective voltages for the input circuit and the output circuit and values $V_{tank}$ and $I_{tank}$ of respective voltages and currents for the energy storage circuit and uses the predicted equivalent circuit values $V_1$, $V_2$, $V_{tank}$ and $I_{tank}$ for controlling the amount of energy stored in the energy storage circuit and for controlling the output waveform generated by the output circuit using energy stored in the energy storage circuit.

9. The energy control circuit of claim 8, further comprising a transformer that is connected on one of a side of the input circuit, a side of the output circuit, or between the input circuit and the output circuit.

10. The energy control circuit of claim 8, wherein the controller compares a measured value of $I_{tank}$ with the predicted value of $I_{tank}$ to ensure that the predicted equivalent circuit values $V_1$, $V_2$, $V_{tank}$ are accurate.

11. The energy control circuit of claim 8, wherein the controller grades measured line and load voltages and corresponding measured currents of a plurality of switches of the input circuit and the output circuit into three bins including a most positive voltage, a most negative voltage, and a voltage most near zero.

12. The energy control circuit of claim 11, wherein the controller grades the corresponding measured currents of the plurality of switches into six modes of operation comprising:
a first mode, N-Sink, when a measured voltage is most negative and a sign of a measured current is negative;
a second mode, Z-Sink when a measured voltage is most near zero and a sign of a measured current is negative;
a third mode, P-Source, when a measured voltage is most positive and a sign of a measured current is positive;
a fourth mode, P-Sink, when a measured voltage is most positive and a sign of a measured current is negative;
a fifth mode, Z-Source, when a measured voltage is most near zero and a sign of a measured current is positive; and
a sixth mode, N-Source, when a measured voltage is most negative and a sign of a measured current is positive.

13. A method for controlling an energy control circuit, the method comprising:
controlling an amount of energy stored in an energy storage circuit of the energy control circuit;
controlling a waveform generated by an output circuit of the energy control circuit using energy stored in the energy storage circuit; and
controlling a plurality of switches and a switch frequency, which is equal to a frequency at which the plurality of switches are selected, based on the energy stored in the energy storage circuit such that as the amount of energy stored in the energy storage circuit increases, the switch frequency decreases, and vice versa.

14. The method of claim 13, wherein the method further comprises:
predicting equivalent circuit values $V_1$, $V_2$ of respective voltages for an input circuit of the energy control circuit and the output circuit and values $V_{tank}$ and $I_{tank}$ of respective voltages and currents for the energy storage circuit; and
using the predicted equivalent circuit values $V_1$, $V_2$, $V_{tank}$ and $I_{tank}$ for controlling the amount of energy stored in the energy storage circuit and for controlling the waveform generated by the output circuit using energy stored in the energy storage circuit.

15. The method of claim 14, wherein the method further comprises comparing a measured value of $I_{tank}$ with the predicted value of $I_{tank}$ to ensure that the predicted equivalent circuit values $V_1$, $V_2$, $V_{tank}$ are accurate.

16. The method of claim 14, wherein the method further comprises grading measured line and load voltages and corresponding measured currents of a plurality of switches of the input circuit and the output circuit into three bins including a most positive voltage, a most negative voltage, and a voltage most near zero.

17. The method of claim 16, wherein the method further comprises grading the corresponding measured currents of the plurality of switches into six modes of operation comprising:
a first mode, N-Sink, when a measured voltage is most negative and a sign of a measured current is negative;
a second mode, Z-Sink when a measured voltage is most near zero and a sign of a measured current is negative;
a third mode, P-Source, when a measured voltage is most positive and a sign of a measured current is positive;
a fourth mode, P-Sink, when a measured voltage is most positive and a sign of a measured current is negative;
a fifth mode, Z-Source, when a measured voltage is most near zero and a sign of a measured current is positive; and
a sixth mode, N-Source, when a measured voltage is most negative and a sign of a measured current is positive.

18. The method of claim 14, wherein the method further comprises one of obtaining or maintaining specific voltage ratios or galvanic isolation between the input circuit and the output circuit using a transformer.

\* \* \* \* \*